United States Patent [19]

Karasaki et al.

[11] 4,415,246
[45] Nov. 15, 1983

[54] FOCUS DETECTING DEVICE

[75] Inventors: Toshihiko Karasaki, Sakai; Takayuki Gotoh; Yasuhiro Namba, both of Osaka; Eiji Yamakawa, Sakai, all of Japan

[73] Assignee: Minolta Camera Kabushiki Kaisha, Osaka, Japan

[21] Appl. No.: 387,201

[22] Filed: Jun. 10, 1982

[30] Foreign Application Priority Data

Jun. 11, 1981 [JP] Japan .................................. 56-90351

[51] Int. Cl.³ ............................ G03B 3/10; G01J 1/44
[52] U.S. Cl. ...................................... 354/25; 250/201; 250/209; 250/578
[58] Field of Search ................... 354/25 R, 25 A, 25 P, 354/25 N, 31 F; 250/201, 209, 578; 357/30

[56] References Cited

U.S. PATENT DOCUMENTS 4,349,254  9/1982  Jyojiki et al. ......................... 354/25

Primary Examiner—William B. Perkey
Attorney, Agent, or Firm—Wenderoth, Lind & Ponack

[57] ABSTRACT

The disclosure relates to a focus detecting device for detecting a focusing condition of an objective lens on a focal plane by the detection of contrast of an image formed by the objective lens. The device includes an elongated biconcave cylindrical lens for forming a line image, a glass plate positioned parallely to the cylindrical lens, and a plurality of photodiodes deposited on the opposite flat surfaces of the glass plate in arrays parallel to the axial direction of the elongated cylindrical lens such that the photodiode arrays on the opposite flat surfaces are disposed alternately in an interlaid manner. When the line image formed on the photodiodes deposited on one surface of the glass plate is front-focus condition and the line image formed on the photodiodes deposited on the other surface of the glass plate is rear-focus condition, a detector indicates that the line image formed on a plane between the opposite flat surfaces is in-focus condition.

10 Claims, 17 Drawing Figures

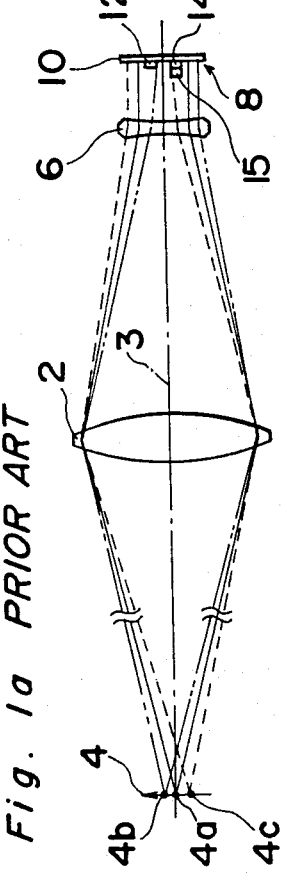
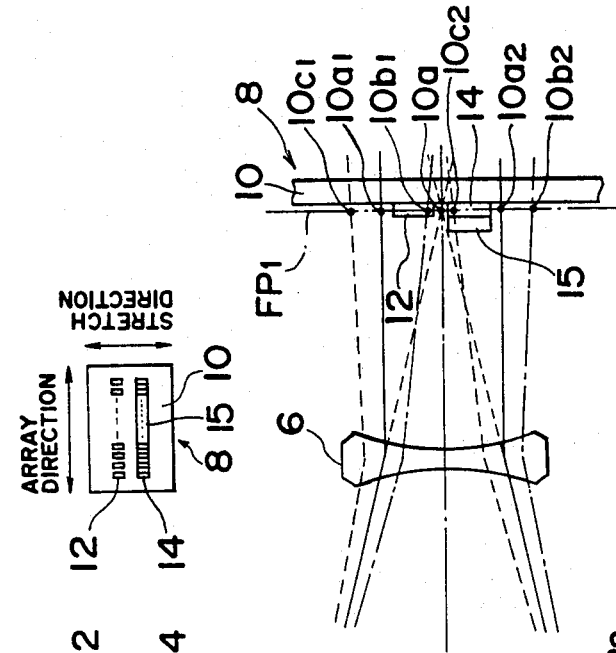
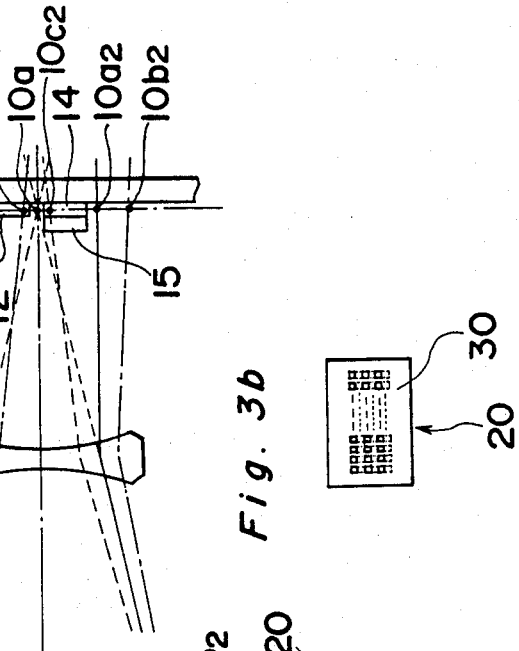
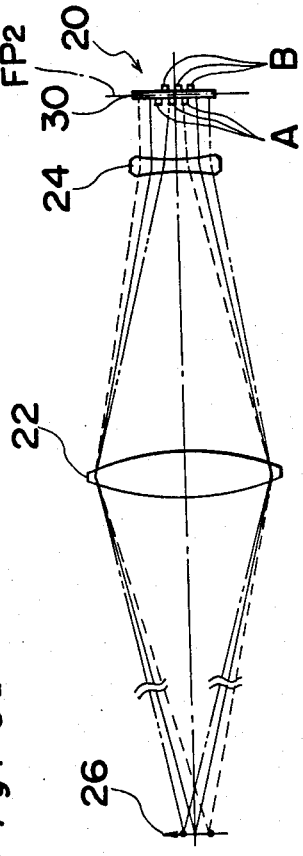

FOCUS DETECTING DEVICE

BACKGROUND OF THE INVENTION

1. Field of the Invention

The present invention relates to a focus detecting device for use in a camera and, more particularly, to an improvement in the arrangement of a focus detecting device of a type which utilizes detection of a contrast between neighboring sections of an image.

2. Description of the Prior Art

A prior art focus detecting device is shown in FIG. 1a which includes an objective lens 2 and a biconcave cylindrical lens 6 having a curvature only in up and down directions and no curvature in a direction perpendicular to a plane of drawing. The objective lens 2 converges light beams reflected from a target object 4 to be focused, and the cylindrical lens 6 diverges the light beams up and down to form a stretched line image on a light receiving unit 8.

The light receiving unit 8, as best shown in FIG. 1b, includes a substrate 10, a first array 12 of a plurality of light sensitive elements aligned in a row with a predetermined pitch and deposited on a front face of the substrate 10 facing the cylindrical lens 6, and a second array 14 of a plurality of light receiving elements aligned similarly on the front face of the substrate 10. Each light sensitive element has an identical rectangular configuration. The first and second arrays 12 and 14 are aligned parallel to each other above and below a center line of the substrate 10, which center line locates perpendicularly to an optical axis 3 of the lenses 2 and 6. Both of arrays 12 and 14 are positioned closely adjacent to each other. Neighboring light sensitive elements in each of the first and the second arrays 12 and 14 are also positioned closely to each other.

A transparent plate 15 is deposited so as to cover only light sensitive elements of the second array 14. Therefore, the optical path length from the cylindrical lens 6 to the second array 14 is longer than the optical path length from the cylindrical lens 6 to the first array 12. Therefore, the focus condition of an image of the target object 4, formed on the first array 12 by the objective lens 2 and the cylindrical lens 6, is different from that formed on the second array 14. More particularly, when the lens 2 is so positioned as to properly focus the image of the target object 4 on a predetermined focal plane FP1 positioned on optically middle plane of the first and second arrays, the image of the target object 4 on the first array 12 will be out-of-focus such that other object further away from the lens 2 than the target object 4 will be properly focused on the first array 12 and, at the same time, the image of the target object 4 on the second array 14 will be out-of-focus such that further other object which is closer to lens 2 than the target object 4 will be properly focused on the second array 14. The focus conditions of the images each formed on the first or the second array 12 or 14 are respectively determined by means of detecting contrast of each image in the direction perpendicular to the drawing in FIG. 1a. Such contrast can be detected from the differences of signals generated by neighboring light sensitive elements of the first or the second array 12 or 14.

The cylindrical lens 6 stretches the image in such a manner that a point image to be formed on the light receiving unit 8 by the objective lens 2 will be expanded in a certain direction to convert the point image into a line image. The direction of such a stretch (hereinafter referred to as a stretch direction) is so adjusted as to be in a perpendicular relation to the direction of alignment of the first, and second, array (hereinafter referred to as an array direction).

More particularly, when there is no cylindrical lens 6, a center point 4a of the target object 4 will be focused at a center 10a (FIG. 2) on the predetermined focal plane FP. When the cylindrical lens 6 is provided, however, the point image 10a will be stretched and converted into a line image extending between points 10a1 and 10a2 (FIG. 2) covering both the first and second arrays 12 and 14. Therefore, the first and second arrays 12 and 14 receive approximately the same amount of light reflected from the point 4a.

According to the prior art focus detecting device, however, there is such a disadvantage that the first and second arrays 12 and 14 receive different amount of light when a whole image of the target object 4 is taken into consideration. For example, a point 4b on the target object 4 is focused on the focal plane FP1 as a line image extending between points 10b1 and 10b2 (FIG. 2) covering almost only the second array 14. And, a point 4c on the target object 4 is focused on the focal plane FP1 as a line image extending between points 10c1 and 10c2 (FIG. 2) covering almost only the first array 12. Thus, the first array 12 almost only receives the light beams reflected from the lower half portion of the target object 4, and the second array 14 almost only receives the light beams reflected from the upper half portion of the target object 4 and, therefore, the total light intensity of the image formed on the first array 12 differs from that on the second array 14. Such a difference is eminent particularly when the brightness difference of the target object 4 between its upper portion and lower portion is great. Therefore, the difference of the focus condition between the images on the first and second arrays 12 and 14 can not be properly evaluated by using the above light receiving unit 8.

In order to eliminate such a disadvantage, one approach is to arrange the first and second arrays 12 and 14 as close as possible to the optical axis 3, that is, to shorten the length of each light sensitive element in the stretch direction and, at the same time, to narrow the distance between the first and second arrays 12 and 14. When such an arrangement is employed, however, a light receiving area of each light sensitive element becomes small and, therefore, an electric signal produced from each light sensitive element becomes weak. Thus, in the processing circuit, it is very difficult to distinguish the wanted signal from the noise signal.

It is to be noted that the light receiving area of a light sensitive element is defined by its length in the stretch direction and its width in the array direction. Therefore, in the above arrangement, it may be possible to obtain a light sensitive element having a large area by increasing the width of the light sensitive element in its array direction. However, since the detectible spatial frequency of the image by the light sensitive elements becomes low in proportion to increase the width thereof, the increase of the width of the light sensitive element results in poor detection of the focus condition.

Another approach is to shift the position of the cylindrical lens 6 towards objective lens 2 to elongate the line image in the stretch direction so that the line images each of points 4b and 4c cover both arrays 12 and 14. If this arrangement is employed, it is necessary to enlarge the size of the cylindrical lens 6 particularly in the stretch direction. Since a single-reflex-lens camera, which utilizes its picture-taking-lens also for the objective lens 2, has a limited space, such a large cylindrical lens 6 with a considerably long distance between the cylindrical lens 6 and the light receiving unit 8 is not suitable. Furthermore, when the light receiving unit 8 and the cylindrical lens 6 are prepared together as a module, the size of such a module becomes undesirably large.

SUMMARY OF THE INVENTION

The present invention has been developed with a view to substantially solving the above described disadvantages and has for its essential object to provide an improved focus detecting device which employs improved arrays of light receiving elements so that the device can produce a signal to the processing circuit in high amplitude.

It is also an essential object of the present invention to provide a focus detecting device which is compact in size and can readily be manufactured at low cost.

In accomplishing these and other objects, a focus detecting device according to the present invention comprises an elongated cylindrical lens element having an axis extending in the elongated direction of the cylindrical lens. The cylindrical lens is located between an objective lens and a predetermined focal plane on which a focusing condition of the objective lens is detected. The axis of the cylindrical lens extends perpendicularly to an optical axis of the objective lens. The focus detecting device further comprises a light receiving unit comprising at least first, second, third and fourth photodiode arrays, and means for supporting the first to fourth photodiode arrays. The first photodiode array has a plurality of first photodiodes located on a first plane parallel to the predetermined focal plane. The first photodiodes are arranged, closely adjacent to each other, along a predetermined direction perpendicular to the axis of the cylindrical lens. The second photodiode array has a plurality of second photodiodes located on a second plane parallel to, but apart from the first plane. The second photodiodes are arranged, closely adjacent to each other, along the predetermined direction. The third photodiode array has a plurality of third photodiodes located on the first plane. The third photodiodes are arranged, closely adjacent to each other, along the predetermined direction. And, the fourth photodiode array has a plurality of fourth photodiodes located on the second plane. The fourth photodiodes are arranged, closely adjacent to each other, along the predetermined direction. The first to fourth photodiode arrays are located alternately along a direction parallel to the axis of the cylindrical lens.

The focus detecting device further comprises a means for detecting current flowing through the first to fourth photodiodes so as to detect the contrast.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 1a is a diagrammatic view of a focus detecting device according to the prior art;

FIG. 1b is a diagrammatic view showing an arrangment of light receiving unit employed in the device of FIG. 1a;

FIG. 2 is an enlarged view of a part of FIG. 1a;

FIG. 3a is a diagrammatic view of a focus detecting device according to the present invention;

FIG. 3b is a diagrammatic view showing an arrangement of light receiving unit employed in the device of FIG. 3a;

DESCRIPTION OF THE PREFERRED EMBODIMENTS

Figure 4:
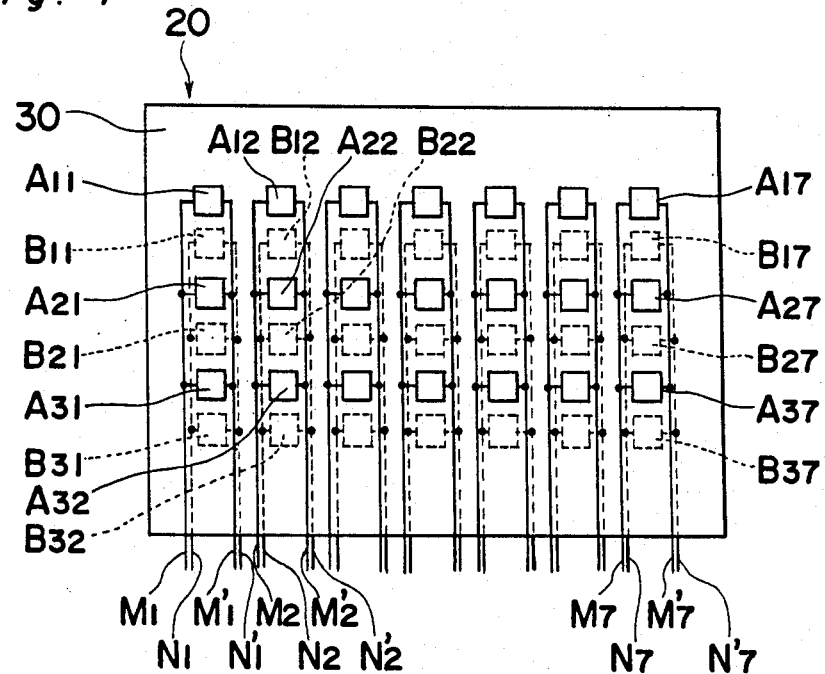
FIG. 4 is a plan view of the light receiving unit in an enlarged scale.
Figure 5:
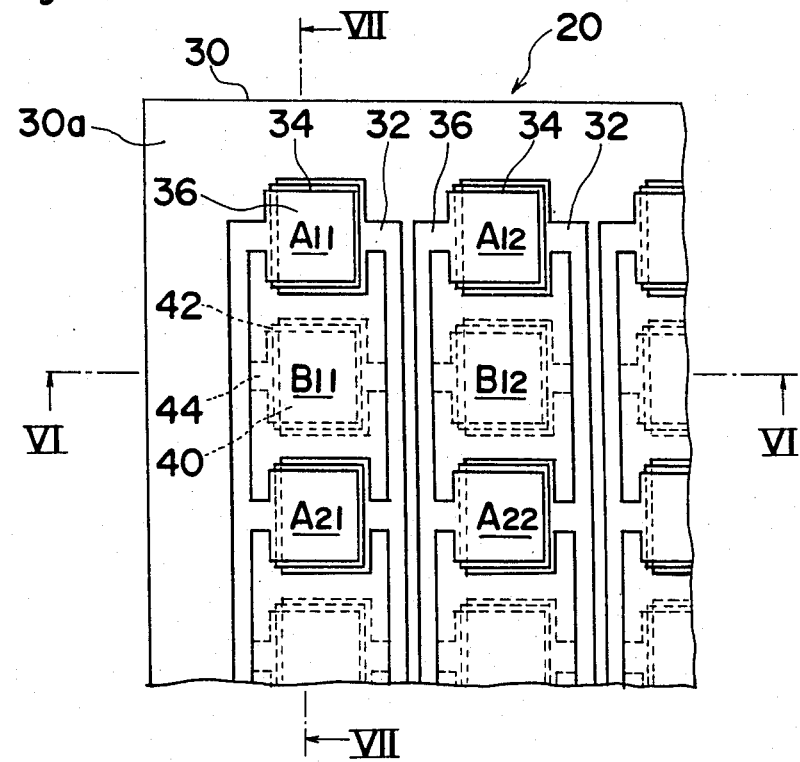
FIG. 5 is a further enlarged view of the light receiving unit showing a part thereof.

Referring particularly to FIGS. 3a and 3b, there is shown a focus detecting device according to the preferred embodiment of the present invention. The focus detecting device comprises a light receiving unit 20 so positioned as to receive light beams transmitted through a lens arrangement including an objective lens 22 and a biconcave cylindrical lens 24 having a curvature only in up and down directions and no curvature in a direction perpendicular to a plane of drawing. The objective lens 22 converges light beams reflected from a target object 26, and the cylindrical lens 24 diverges the light beams up and down to form a stretched line image on the light receiving unit 20. As apparent from the above, the focus detecting device according to the preferred embodiment shown has the same lens arrangement as that of the prior art described above.

The light receiving unit 20 comprises a transparent rectangular plate 30 made of electrically non-conductive material and positioned parallelly to the predetermined focal plane FP2 of the objective lens 22, a first group of light sensitive elements, generally indicated by a reference character A, deposited on a front face of the transparent plate 30 facing the cylindrical lens 24, and a second group of light sensitive elements, generally indicated by a reference character B, deposited on a rear face of the transparent plate 30 opposite to said front face. A detail of the light receiving unit 20 is described below in connection with FIG. 4.

Referring to FIG. 4, the light sensitive elements of the first group A are shown by a real line, and the light sensitive elements of the second group B are shown by a dotted line.

The light sensitive elements of the first group A are aligned in vertical and horizontal directions, i.e., stretch and array directions, and in the example shown in FIG. 4, there are three light sensitive elements aligned vertically and seven light sensitive elements aligned horizontally and, therefore, in total there are shown twenty-one light sensitive elements in the first group A. The three light sensitive elements of the first group A which are aligned in the leftmost column are designated by reference characters A11, A21 and A31, respectively. And, those in the second column are designated by reference characters A21, A22 and A23. Other light sensitive elements of the first group A are referred to in a similar manner and, thus, those in the seventh column are A17, A27 and A37.

The light sensitive elements in the second group B are aligned in a similar manner to those of the first group A and, in the example shown in FIG. 4, there are three light sensitive elements in a column and seven in a row. The three light sensitive elements aligned in the leftmost column are designated by reference characters B11, B21 and B31, respectively. And, those in the second column are designated by reference characters B12, B22 and B32, and those in the last column are designated by reference characters B17, B27 and B37.

In the horizontal direction, the light sensitive elements of the first and second groups A and B are respectively positioned with a predetermined pitch suitable for detecting desirable high spatial frequency component of each images. In the vertical direction, the light sensitive elements of the first group A and those of the second group B are positioned alternately with another predetermined pitch spaced therebetween so that the rows of the light sensitive elements in the group A and those of the group B are disposed in an interlaid manner, when viewed in FIG. 4. A further detail of the spacing between the two light receiving elements aligned in column, such as between the two light receiving elements A11 and B11, will be described later in connection with FIGS. 10 to 13.

The light sensitive elements in a column in each group are electrically connected with each other. For example, the light sensitive elements A11, A21 and A31 in the first column are connected parallelly to each other between lead lines M1 and M'1, and the light sensitive elements A21, A22 and A23 are connected parallelly to each other between lead lines M2 and M'2. Similarly, the light sensitive elements B11, B21 and B31 in the first column are connected parallelly to each other between lead lines N1 and N'1, and the light sensitive elements B21, B22 and B23 are connected parallelly to each other between lead lines N2 and N'2.

When compared with the the prior art described above, it can be said that the light receiving unit 20 according to the present invention is formed by dividing each of the elongated light sensitive elements of the prior art into three sections and by disposing the divided sections of the groups A and B alternately in vertical direction. Therefore, it can be said that the light sensitive elements aligned in a row, i.e., A11, A12, A13, ..., A17 can be considered as one array of light sensitive elements and, thus, in the example shown, there are three arrays of light sensitive elements in the group A and three arrays of light sensitive elements in the group B which are aligned alternately in an interlaid manner. When the arrangement according to the present invention is employed, the light sensitive elements in a column, e.g., A11, A21 and A31 can cover a region wider than the prior art in the vertical direction, i.e., stretch direction mentioned above. Therefore, the light sensitive elements in a column can receive line images of upper and lower portions of the target object 26.

From another point of view, it can be said that one light receiving element of the group A and one light receiving element of the group B which are positioned one over the other, such as light receiving elements A11 and B11, define a base unit occupying a small area and, in the example shown in FIG. 4, there are three base units disposed in a column. Therefore, even if there is a brightness difference in the image between its upper portion and its lower portion, such a difference will not appear in the signal obtained from, e.g., the lines M1 and M'1 and the signal obtained from, e.g., the lines N1 and N'1.

It is to be noted that the number of rows and number of columns of the aligned light receiving elements in each group, which have been described as three rows and seven columns, can be any other number equal to or greater than two.

Next, the detailed structure of the light receiving unit 20, particularly the structure of each light receiving element, is described in connection with FIGS. 5 to 8.

Referring to FIGS. 5 to 8, the light receiving unit 20 is formed on the transparent plate such as a glass plate having a predetermined thickness D (FIG. 7), such as 0.3 to 0.4 mm in an optical distance (An optical distance is equal to geographical distance times refractive index of a material through which light passes, thus, in this case, the refractive index of a glass). On the front face 30a of the glass plate 30, an electrically conductive layer 32 is deposited in a predetermined pattern to define one electrode of the light sensitive elements of the first group A and the lead lines M'1, M'2 and so on. Such an electrically conductive layer 32 is formed, e.g., by an aluminum film.

Figure 8:
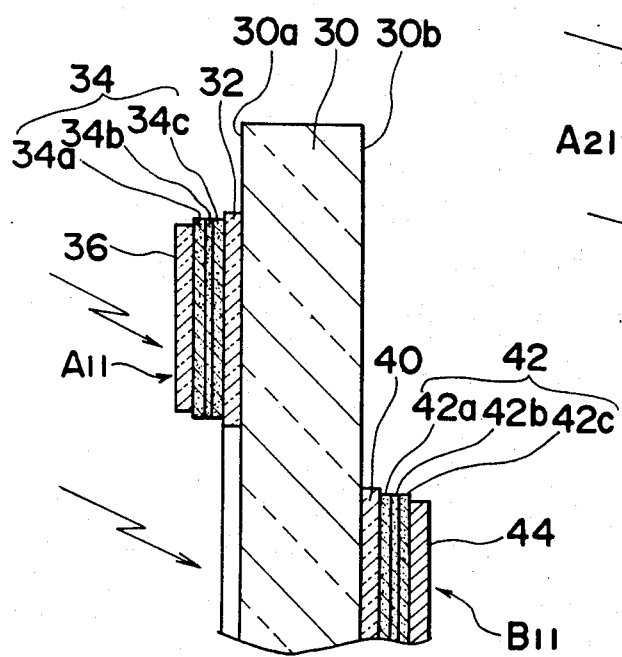
FIG. 8 is a still further enlarged view showing a detail of a portion of FIG. 7.

Thereafter, on each electrode layer 32, an amorphous silicon layer 34 comprising p-type layer 34a, i-type layer 34b and n-type layer 34c, as best shown in FIG. 8, is deposited.

Then, transparent and electrically conductive layer 36 is deposited in a predetermined pattern to define the other electrode of the light sensitive elements of the first group A and the lead line M1, M2 and so on. Such a transparent and electrically conductive layer 32 is formed, e.g., by an ITO layer ($In_2O_3$—$SnO_2$)5.

As understood to those skilled in the art, one light sensitive element, which is according to the preferred embodiment a photodiode, is formed by the amorphous silicon layer 34 sandwiched between two electrodes 32 and 34.

Figure 6:
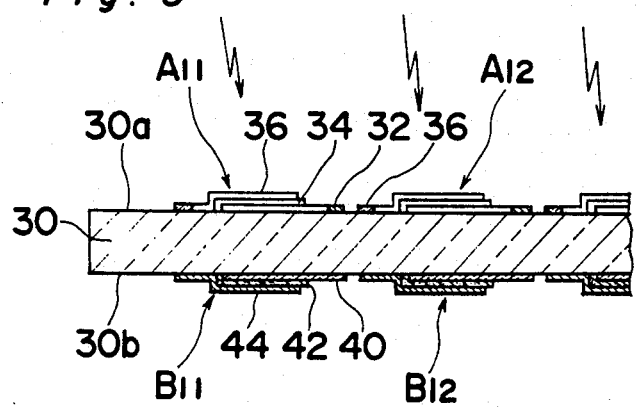
FIGS. 6 and 7 are cross-sectional views taken along lines VI—VI and VII—VII shown in FIG. 5.
Figure 7:
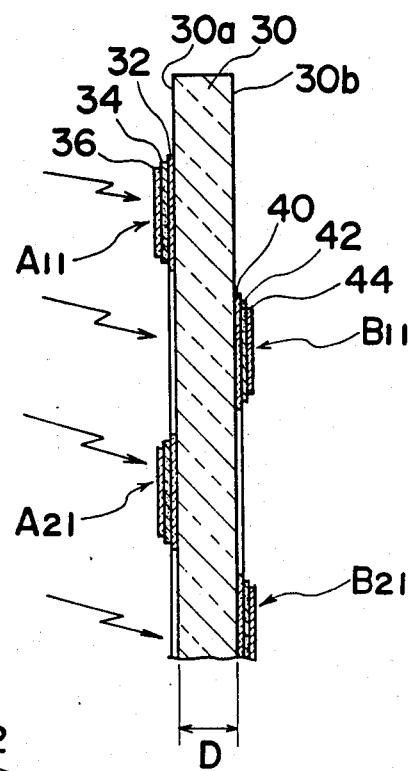

Thus, by the above arrangement, a plurality of photodiodes of the group A aligned vertically and horizontally are formed on the front face 30a of the glass plate 30, and each photodiode reacts to lights that impinges on the photodiodes, as shown by arrows in FIGS. 6, 7 and 8.

On the back face 30b of the glass plate 30, the light sensitive elements of the second group B are formed in the following steps.

First, a transparent and electrically conductive layer 40 is deposited in a predetermined pattern to define one electrode of the light sensitive elements of the second group B and the lead line N'1. Such a transparent and electrically conductive layer 32 is formed, e.g., by an ITO layer ($In_2O_3$—$SnO_2$)5. Thereafter, on each transparent electrode layer 40, an amorphous silicon layer 42 comprising p-type layer 42a, i-type layer 42b and n-type layer 42c, as best shown in FIG. 8, is deposited.

Then, a non-transparent an electrically conductive layer 44 is deposited in a predetermined pattern to define the other electrode of the light sensitive elements of the second group B and the lead line N1. Such an opaque and electrically conductive layer 44 is formed by an aluminum film.

Next, a processing circuit 50 for processing the signal obtained from the light receiving unit 20 is explained.

Figure 9:
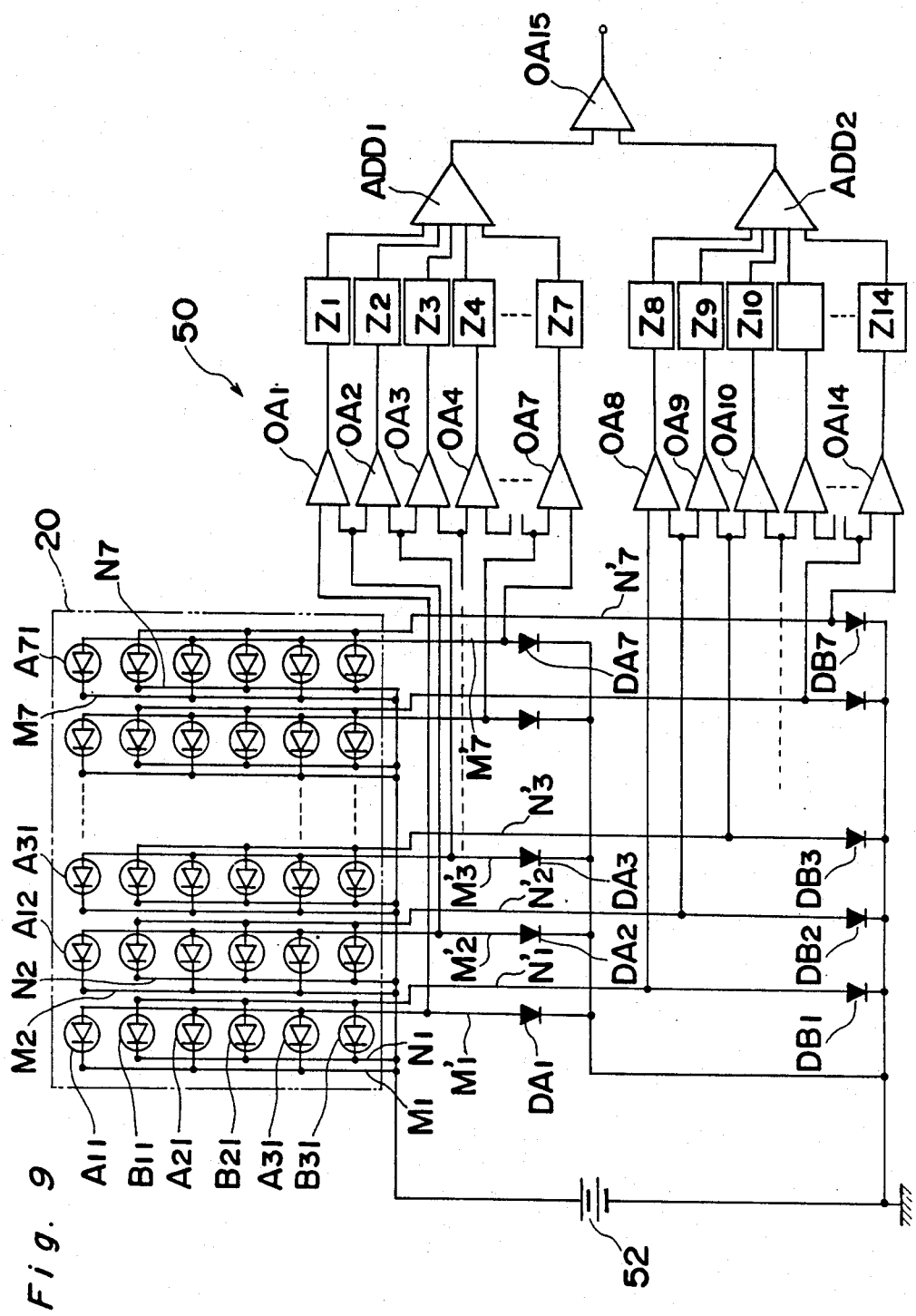
FIG. 9 is a circuit diagram showing a processing circuit for processing signal obtained from the light receiving unit.

Referring to FIG. 9, the light receiving unit 20 is shown using a symbol of photodiode for each of the light receiving elements. The lead lines M1, M2, ..., M7 and the lead lines N1, N1, ..., N7, which are connected to the cathode side of each photodiode, are connected to each other and further to a positive side of a power source 52.

The lead line M'1 connected to the anode side of the photodiodes A11, A21 and A31 in the first column of the group A is connected through a diode DA1 to ground. The diode DA1 is provided for effecting the logarithmic compression of the signal obtained from the lead line M'1. The logarithmically compressed signal by the photodiode DA1 is applied to a first input of a difference amplifier OA1.

Similarly, the lead line M'2 connected to the anode side of the photodiodes A12, A22 and A32 in the second column of the group A is connected through a logarithmic compression diode DA2 to ground. The logarithmically compressed signal by the diode DA2 is applied to a second input of the difference amplifier OA1 and also to a first input of a difference amplifier OA2. Accordingly, the difference amplifier OA1 produces a difference signal relative to the difference between two logarithmically compressed signals. More particularly, such a difference signal is relative to the ratio of signal level between the signal obtained from the photodiodes A11, A21 and A31 in the first column in the group A and that obtained from the photodiodes A12, A22 and A32 in the second column in the group A.

In this manner, the photodiodes in a column in group A are connected to a logarithmically compression diode DAn (n being a number between 1 and 7) and further to a difference amplifier OAn (n being a number between 1 and 7). Thus, each of the difference amplifier OA1 to OA7 produces a difference signal representing a difference between two logarithmically compressed signals obtained from two neighboring columns in the group A.

The difference amplifiers OA1 to OA7 are further connected to absolute circuits Z1 to Z7, respectively, for taking an absolute value of the calculated difference from each difference amplifier.

An adder ADD1 is provided for receiving outputs from each of the absolute circuits Z1 to Z7, so that the adder ADD1 produces a sum of the absolute values of the difference signals.

In a similar manner, the lead line N'1 connected to the anode side of the photodiodes B11, B21 and B31 in the first column of the group B is connected through a logarithmic compression diode DB1 to ground. Thus, the diode DB1 produces a logarithmically compressed signal which is applied to a first input of a difference amplifier OA8.

Furthermore, the lead line N'2 connected to the anode side of the photodiodes B12, B22 and B32 in the second column of the group B is connected through a logarithmic compression diode DB2 to ground. The logarithmically compressed signal by the diode DB2 is applied to a second input of the difference amplifier OA8 and also to a first input of a difference amplifier OA9. Accordingly, the difference amplifier OA8 produces a difference signal relative to the difference between two logarithmically compressed signals. As mentioned above, such a difference signal is relative to the ratio of signal level between the signal obtained from the photodiodes B11, B21 and B31 in the first column in the group B and that obtained from the photodiodes B12, B22 and B32 in the second column in the group B.

In this manner, the photodiodes in a column in group B are connected to a logarithmically compression diode DBn (n being a number between 1 and 7) and further to a difference amplifier OAn (n being a number between 8 and 14). Thus, each of the difference amplifier OA8 to OA14 produces a difference signal representing a difference between two logarithmically compressed signals obtained from two neighboring columns in the group B.

The difference amplifiers OA8 to OA14 are further connected to absolute circuits Z8 to Z14, respectively, for taking an absolute value of the calculated difference from each difference amplifier.

An adder ADD2 is provided for receiving outputs from each of the absolute circuits Z8 to Z14, so that the adder ADD2 produces a sum of the absolute values of the difference signals.

The output from the adder ADD1 is connected to a first input of a difference amplifier OA15, and the output from the adder ADD2 is connected to a second input of the difference amplifier OA15. Accordingly the difference amplifier OA15 produces a signal equal to a difference subtracting the output of the adder ADD2 from that of the adder ADD1. Such a difference signal represents focus condition of the objective lens 22 on the predetermined focal plane. When the difference signal produced from the difference amplifier OA15 reaches substantially zero, it is indicated that the objective lens 22 is in in-focus condition on the predetermined focal plane. If the output from the adder ADD1 is greater than that from the adder ADD2, the difference amplifier OA15 generates a positive signal in order to indicate that the objective lens 22 is in front-focus condition. Conversely, if the output from the adder ADD2 is greater than that from the adder ADD1, the difference amplifier OA15 generates a negative signal in order to indicate that the objective lens 22 is in rear-focus condition. The output of the difference amplifier OA15 is connected to an indicating circuit (not shown) which indicates one of three focus conditions which are front-focus condition, in-focus condition and rear-focus condition. The output of the difference amplifier OA15 may be used as a direction signal in an automatic focusing camera for determining a direction to which the objective lens should be shifted by a shifting means like a focusing motor. The difference amplifier OA15 can be replaced by other type of means for comparing two inputs with each other.

It is to be noted that the number of the logarithmic compression diodes, which has been described as being seven for the photodiodes of the first group A and seven for the photodiodes of the second group B, can be varied with respect to the change of number of photodiodes aligned horizontally. The same can be said to the number of difference amplifiers and the number of absolute circuits.

Next, the spacing between two neighboring light receiving elements aligned in the vertical (stretch) direction, such as two light receiving elements A11 and B11, is described.

Figure 10:
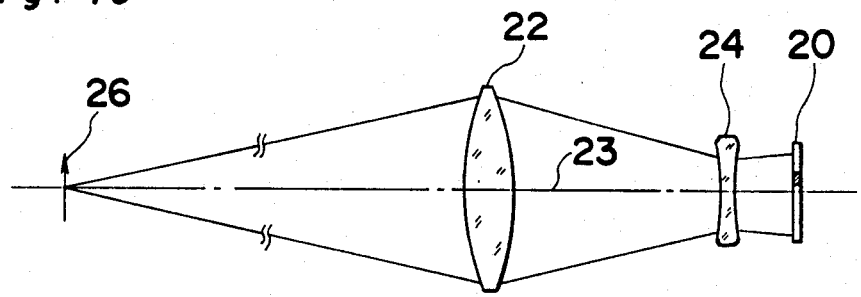
FIGS. 10, 11 and 12 are diagrammatic views showing the divergence of light through the cylindrical lens relative to various positions of the objective lens.
Figure 11:
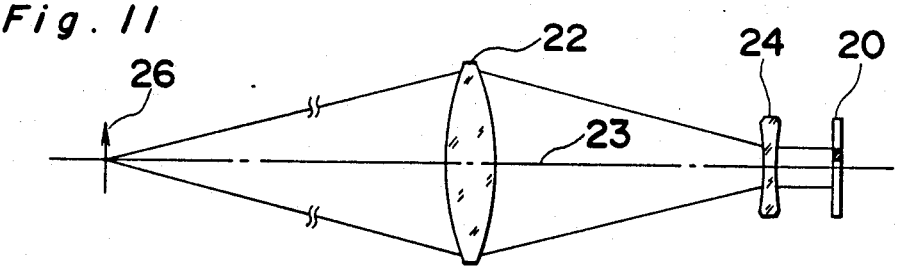
Figure 12:
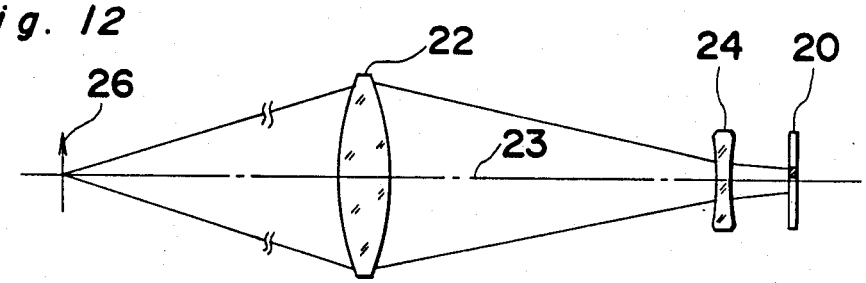

Referring to FIGS. 10, 11 and 12, it is seen that the direction of marginal light beam reflected from a point of the target object 26 varies relative to the distance between the cylindrical lens 24 and the objective lens 22 such that, as the distance between the lenses 22 and 24 becomes greater, the marginal light beam from the cylindrical lens 24 converge towards the optical axis 23.

More particularly, when the distance between the lenses 22 and 24 is short as obtained when the objective lens 22 is shifted to the infinity focusing position, as shown in FIG. 10, the marginal light beam emitted from the cylindrical lens 24 diverge. When the distance between the lenses 22 and 24 is intermediate, as shown in FIG. 11, the marginal light beam emitted from the cylindrical lens 24 directs almost parallelly to the optical axis 23. And, when the distance between the lenses 22 and 24 is relatively long as obtained when the objective lens 22 is shifted to the closest focusing position, as shown in FIG. 12, the marginal light beam emitted from the cylindrical lens 24 converge.

Figure 13:
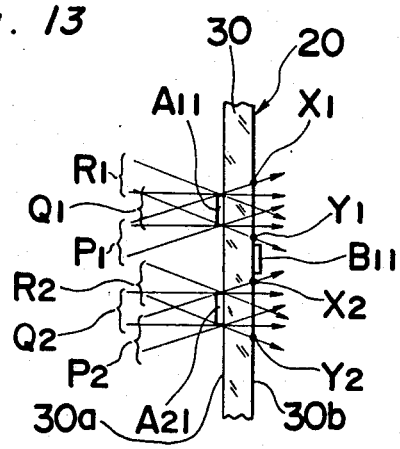
FIG. 13 is a diagrammatic view showing the path of light beams through the light receiving unit.

Referring to FIG. 13, a detail of a hatched portion shown in each of FIGS. 10, 11 and 12 is shown. In the hatched portion, there are included the light receiving elements A11, A21 and B11, as shown in FIG. 13. When the objective lens 22 is located in the position of FIG. 10, a bundle of light beams within a region P1 impinges on the light receiving element A11 and a bundle of light beams within a region P2 impinges on the light receiving element A21. Similarly, when the objective lens 22 is located in the position of FIG. 11, a bundle of light beams within a region Q1 impinges on the light receiving element A11 and a light bundle within a region Q2 impinges on the light receiving element A21. Furthermore, when the objective lens 22 is located in the position of FIG. 12, a light bundle within a region R1 impinges on the element A11 and a light bundle within a region R2 impinges on the element A21.

Since the incident angles of such light beams P, Q and R are different, the points at which the light beams reach the rear face 30b of the transparent plate 30 are different. Therefore, it is understood that a region between points X1 and Y1 and a region between points X2 and Y2 on the rear face 30b may be shaded by the light receiving elements A11 and A21, respectively. Since the light receiving element of the first group A and those of the second group B should preferably receive the same amount of light, it is necessary to provide the light receiving elements of the second group B in the regions avoiding the above mentioned regions that may be shaded. For example, the light receiving element B11 should be provided in a region between points X2 and Y1 as shown.

Figure 14:
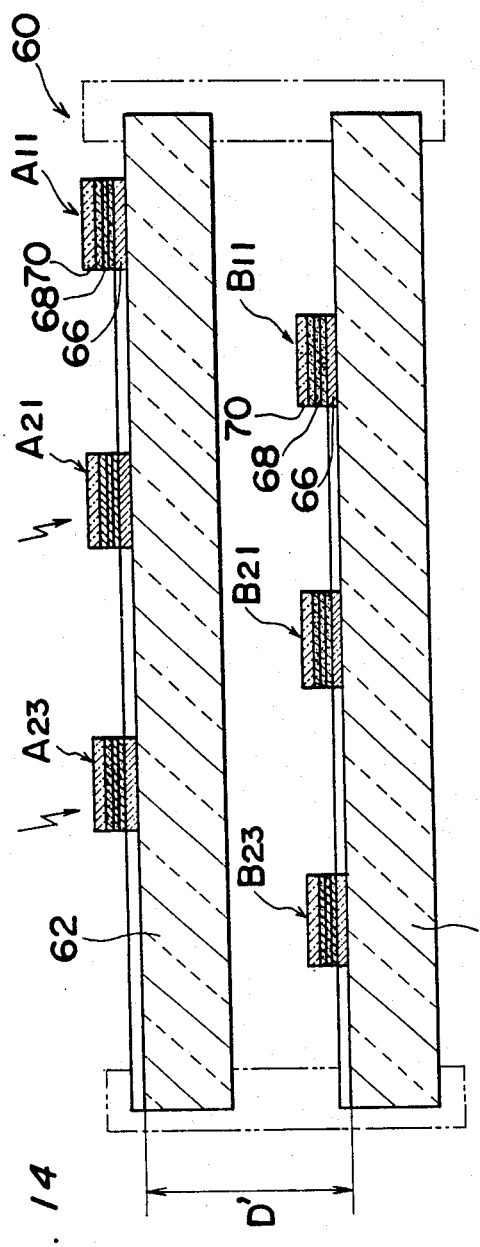
FIGS. 14 and 15 are views similar to FIG. 7, but particularly showing other embodiments of the present invention.

Referring to FIG. 14, there is shown a light receiving unit 60 according to the second embodiment of the present invention. The light receiving unit 60 comprises two transparent plates 62 and 64 held by a suitable support means to position the plates 62 and 64 parallelly to each other with a predetermined distance spaced to obtaining an optical distance D' of 0.3 to 0.4 mm. The first transparent plate 62 is provided for supporting light receiving elements of the first group A, and the second transparent 64 is for supporting light receiving elements of the second group B. In the drawing, only the light receiving elements A11, A21, A31, B11, B21 and B31 are shown. When viewed from the light beam coming direction, as indicated by arrows, the light receiving elements are arranged in the same pattern as that shown in FIG. 4.

It is to be noted that each light receiving element in the group A, e.g., A11, is formed by the layers of aluminum film 66, amorphous silicon layer 68 and ITO layer 70, and that each light receiving element in the group B is formed by the same layers in the same manner. Therefore, the light receiving elements for the group A and for the group B can be manufactured in the same assembly line. Therefore, the total manufacturing cost can be reduced. In this embodiment, it is not necessary that the plate 64 is transparent.

Figure 15:
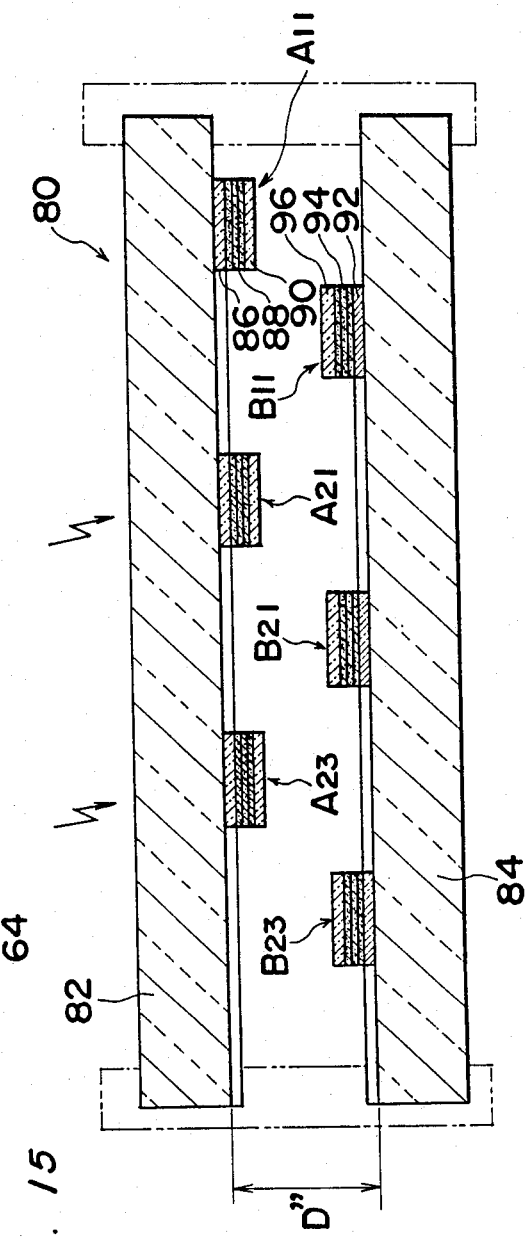

Referring to FIG. 15, there is shown a light receiving unit 80 according to the third embodiment of the present invention. The light receiving unit 80 comprises two substrates 82 and 84 held by a suitable support means to position the substrates 82 and 84 parallelly to each other with a predetermined distance spaced to obtaining an optical distance D" of 0.3 to 0.4 mm. The first substrate 82 made of a transparent material is provided for supporting light receiving elements of the first group A on its surface facing the second substrate 84, and the second substrate 84 is provided for supporting light receiving elements of the second group B on its surface facing the first substrate 82. It is not necessary that the second substrate 84 is transparent. In the drawing, only the light receiving elements A11, A21, A31, B11, B21 and B31 are shown. When viewed from the the light beam coming direction, as indicated by arrows, the light receiving elements are arranged in the same pattern as that shown in FIG. 4.

It is to be noted that each light receiving element in the group A, e.g., A11, is formed by the layers of ITO layer 86, amorphous silicon layer 88 and aluminum layer 90, and that each light receiving element in the group B, e.g., B11 is formed by the layers of aluminum layer 92, amorphous silicon layer 94 and ITO layer 96.

Since the light receiving unit according to the present invention has a plurality of light receiving elements aligned vertically in one plane and the same amount of light receiving elements aligned vertically in another plane, it is possible for the light receiving elements to cover a wide range of image in vertical direction. Furthermore, since such a plurality of light receiving elements aligned vertically are connected parallelly to each other, the signal produced from the light receiving elements aligned vertically has an amplitude sufficiently high for the detection.

Moreover, since it is possible to locate the cylindrical lens further close to the light receiving unit by a suitable arrangement of the light receiving elements in the vertical direction, the light receiving unit and the cylindrical lens can be formed together as an integrated device in a compact size.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A focus detecting device for detecting a focusing condition of an objective lens on a predetermined focal plane by means of detecting a contrast of an image formed by said objective lens comprising:
an elongated cylindrical lens element having an axis extending in the elongated direction of said cylindrical lens, said cylindrical lens located between said objective lens and said predetermined focal plane such that said axis of said cylindrical lens is extending perpendicularly to an optical axis of said objective lens;

a light receiving unit comprising at least first, second, third and fourth photodiode arrays, and means for supporting said first to fourth photodiode arrays;

said first photodiodes array having a plurality of first photodiodes located on a first plane parallel to said predetermined focal plane, said first photodiodes being arranged, closely adjacent to each other, along a predetermined direction perpendicular to said axis of said cylindrical lens;

said second photodiode array having a plurality of second photodiodes located on a second plane parallel to, but apart from said first plane, said second photodiodes being arranged, closely adjacent to each other, along said predetermined direction;

said third photodiode array having a plurality of third photodiodes located on said first plane, said third photodiodes being arranged, closely adjacent to each other, along said predetermined direction;

said fourth photodiode array having a plurality of fourth photodiodes located on said second plane, said fourth photodiodes being arranged, closely adjacent to each other, along said predetermined direction;

said first to fourth photodiode arrays being located alternately along a direction parallel to said axis of said cylindrical lens; and means for detecting current flowing through said first to fourth photodiodes so as to detect said contrast.

2. A focus detecting device as claimed in claim 1, wherein said first and second planes are located on opposite sides of said predetermined focal plane such that a distance between said cylindrical lens and said first plane is shorter than a distance between said cylindrical lens and said second plane.

3. A focus detecting device as claimed in claim 1, wherein each of said first photodiodes and a corresponding third photodiode which are aligned in a parallel direction parallel to said axis of said cylindrical lens are electrically and parallelly connected with each other to define a first unit, and wherein each of said second photodiodes and a corresponding fourth photodiode which are aligned in said parallel direction are electrically and parallelly connected with each other to define a second unit, said detecting means being connected to said first and second units for detecting currents flowing through said first and second units, respectively.

4. A focus detecting device as claimed in claim 3, wherein said detecting means comprises first difference detecting means for detecting each current difference between currents flowing through each of two neighboring first units, first absolute means for taking each absolute value of said difference each obtained from said first difference detecting means, first adding means for adding said absolute values each obtained from said first absolute means, second difference detecting means for detecting each current difference between currents flowing through two neighboring second units, second absolute means for taking each absolute value of said difference each obtained from said second difference detecting means, second adding means for adding said absolute values each obtained from said second absolute means, and subtraction means for producing a difference signal between outputs from said first and second adding means, said difference signal showing substantially zero when said objective lens is in in-focus position on said focal plane.

5. A focus detecting device as claimed in claim 1, wherein said supporting means comprises a transparent substrate having first and second flat faces, said first and third photodiodes being deposited on said first flat face and said second and fourth photodiodes being deposited on said second flat face.

6. A focus detecting device as claimed in claim 5, wherein each of said first and third photodiodes comprises a first electrode layer deposited on said first flat face, an amorphous silicon layer deposited on said first transparent electrode layer, and a first transparent electrode layer deposited on said amorphous silicon layer, and wherein each of said second and fourth photodiodes comprises a second transparent electrode layer deposited on said second flat face, an amorphous silicon layer deposited on said second transparent electrode layer, and a second electrode layer deposited on said amorphous silicon layer.

7. A focus detecting device as claimed in claim 1, wherein said supporting means comprises a first transparent substrate for supporting said first and third photodiodes and a second transparent substrate for supporting said second and fourth photodiodes.

8. A focus detecting device as claimed in claim 7, wherein each photodiode in each of said first, second, third and fourth photodiodes comprises a first electrode deposited on said first or second substrate, an amorphous silicon layer deposited on said first transparent electrode, and a second transparent electrode deposited on said amorphous silicon layer.

9. A focus detecting device as claimed in claim 1, wherein said supporting means comprises a first transparent substrate for supporting said first and third photodiodes, and a second substrate for supporting said second and fourth photodiodes, each photodiode in each of said first and third photodiodes comprising a first transparent electrode deposited on said first transparent substrate, an amorphous silicon layer deposited on said first transparent electrode, and a second electrode deposited on said amorphous silicon layer, and each photodiode in each of said second and fourth photodiodes comprises a third electrode deposited on said second substrate, an amorphous silicon layer deposited on said electrode and a fourth transparent electrode deposited on said amorphous silicon layer.

10. A focus detecting device as claimed in claim 5, wherein said amorphous silicon layer comprises, from light incident side, p-type amorphous silicon layer, i-type amorphous silicon layer and n-type amorphous silicon layer.

* * * * *